(12) United States Patent
Casadio et al.

(10) Patent No.: US 11,010,434 B2
(45) Date of Patent: May 18, 2021

(54) PROCESS FOR LEGAL CERTIFICATION OF SUCCESSFUL INTERACTION

(71) Applicant: KOPJRA S.R.L., Bologna (IT)

(72) Inventors: Emanuele Casadio, Russi (IT); Luis Perez Sanchez, Bologna (IT); Matteo Scapin, Torrebelvicino (IT); Tommaso Grotto, Schio (IT)

(73) Assignee: KOPJRA S.R.L., Bologna (IT)

( * ) Notice: Subject to any disclaimer, the term of this patent is extended or adjusted under 35 U.S.C. 154(b) by 257 days.

(21) Appl. No.: 16/219,339

(22) Filed: Dec. 13, 2018

(65) Prior Publication Data

US 2019/0197060 A1 Jun. 27, 2019

(30) Foreign Application Priority Data

Dec. 21, 2017 (IT) .......................... 102017000148623

(51) Int. Cl.
*G06F 16/00* (2019.01)
*G06F 16/93* (2019.01)
(Continued)

(52) U.S. Cl.
CPC .......... *G06F 16/93* (2019.01); *G06F 16/2428* (2019.01); *G06F 16/953* (2019.01);
(Continued)

(58) Field of Classification Search
CPC ............. G06F 12/1466; G06F 16/2228; G06F 16/24532; G06F 16/254; G06F 21/6218;
(Continued)

(56) References Cited

U.S. PATENT DOCUMENTS

2009/0249440 A1* 10/2009 Platt ........................ H04L 63/20
726/1
2014/0337093 A1* 11/2014 Jain ....................... H04L 67/306
705/7.29

(Continued)

OTHER PUBLICATIONS

Italian Search Report dated Jul. 27, 2018 from counterpart Italian App No. IT 201700148623.
(Continued)

*Primary Examiner* — Shyue Jiunn Hwa
(74) *Attorney, Agent, or Firm* — Shuttleworth & Ingersoll, PLC; Timothy J. Klima

(57) ABSTRACT

A process certifies an interaction between a user and an Organization. A Company WEB server requests an acquisition system (WIAS) generate a new redirection URL address (F-URL), simultaneously with sending a pre-redirected HTML form, the (F-URL) pointing to a gateway for verifying in the request the presence of a TOKEN/COOKIE indicating instantiation of a dedicated acquisition memory-storage on the server. If the TOKEN/COOKIE is not present the dedicated acquisition memory-storage is instantiated in the server and the certified acquisition step is started. Upon completion of the step for certified acquisition of the interaction the request of the user is again directed to the original URL address (O-URL), with confirmation of the acceptance to the user, the application of a time mark and an identification symbol, obtaining a certification having legal proof value, sent to a device for storing legal proof certifications.

20 Claims, 3 Drawing Sheets

(51) Int. Cl.
| | |
|---|---|
| H04L 29/08 | (2006.01) |
| G06Q 50/18 | (2012.01) |
| G06F 16/953 | (2019.01) |
| H04L 29/06 | (2006.01) |
| G06F 16/242 | (2019.01) |
| G06F 16/955 | (2019.01) |
| G06Q 10/10 | (2012.01) |
| G06Q 30/00 | (2012.01) |

(52) U.S. Cl.
CPC ......... *G06F 16/9566* (2019.01); *G06Q 10/10* (2013.01); *G06Q 30/018* (2013.01); *G06Q 50/18* (2013.01); *H04L 67/02* (2013.01); *H04L 67/146* (2013.01); *H04L 67/2814* (2013.01); *H04L 67/42* (2013.01)

(58) Field of Classification Search
CPC ........ G06F 8/36; G06F 16/00; G06F 16/9535; G06F 16/954; G06F 16/955; G06F 16/9558; G06F 16/958; G06F 3/00; G06F 40/18; G06F 16/2428; G06F 16/93; G06F 16/953; G06F 16/9566; G06F 13/00; G06F 16/24578; G06F 16/44; G06F 8/61

See application file for complete search history.

(56) References Cited

U.S. PATENT DOCUMENTS

2015/0186913 A1\* 7/2015 Mann ................. G06Q 30/0219
  705/14.21
2018/0131573 A1\* 5/2018 Matsuda ............. H04L 43/0817

OTHER PUBLICATIONS

Corrado Federici: "Cloud Data Imager: A unified answer to remote acquisition of cloud storage areas", Digital Investigation, vol. 11, No. 1, Mar. 1, 2014 (Mar. 1, 2014), pp. 30-42, XP055495907, Amsterdam, NL ISSN: 1742-2876, DOI: 10.1016/j.diin.2014.02.002.

Ajijola Akinola et al: "A review and comparative evaluation of forensics guidelines of NIST SP 800-101 Rev.1:2014 and ISO/IEC 27037:2012", World Congress on Internet Security (WORLDCIS-2014), Infonomics Society, Dec. 8, 2014 (Dec. 8, 2014), pp. 66-73, XP032731371, DOI: 10.1109/WORLDCIS.2014.7028169 [retrieved on Jan. 30, 2015].

\* cited by examiner

PROCESS FOR LEGAL CERTIFICATION OF SUCCESSFUL INTERACTION

This application claims priority to Italian Patent Application 102017000148623 filed Dec. 21, 2017, the entirety of which is incorporated by reference herein.

BACKGROUND OF THE INVENTION

This invention relates to the technological field concerning telematic interaction between users and companies or organizations. More specifically, the invention relates to a process configured for interacting with a system for data exchange and acquisition of requests from the user, in order to certify the interactions which have actually occurred.

The quantity of multimedia operations currently performed is enormous and constantly growing. During the phenomenon known as digitization of events and documents, a rapid transformation is occurring of the first from factual (meetings between physical persons) to virtual (teleconferences, access to social media, blogs, content sharing platforms, etc.) and of the second from hardcopy (documents, correspondence, etc.) to electronic (files, emails, etc.).

It is often the case that a Company, during the actuation of many processes, is involved in bilateral interactions with an end user, for example, but not only, in the field of e-commerce, which is now very widespread, or with the platforms which sell services by means of on-line agreements.

This results in critical situations when the Company finds itself having to prove that a certain interaction, by which the end user has undertaken an obligation or has committed itself in any way or has made an agreement such that the Company can implement actions even on behalf of the user or in some way aimed at the user, has actually taken place.

For example, a user could sign up to an on-line subscription with a service provider or give authorization that its data is diffused and used for promotional, advertising or retail initiatives.

By using the generic technologies which are currently available, the certification of an interaction which has occurred between the user and a WEB platform with which certain agreements have been made between the later and the Company owning the platform may be difficult, also because the registrations on the servers used for activating the services provided by the platform do not have an enormous legal value and can easily be the subject of objections and disputes in the context of a legal process.

On the other hand, systems exist which certify the interactions, for example in the banking and financial sector, giving proof of the desire of the user with respect to the transactions which have occurred, but, apart from the high costs, these systems involve complex processes which penalize the activity of the end user on the platform and can discourage the continuation, with the risk of losing it.

The desire of the Company is, on the other hand, that of more actively involving the user, rendering the receipt of the proposals simple and inviting, without tortuous paths and without repeated requests for confirmation and insertion of security codes.

There is therefore a need to provide a tool which allows the certification of successful interactions in an efficient but simple manner and without directly involving the user, but on the basis of its explicit actions.

SUMMARY OF THE INVENTION

The aim of this invention is therefore to propose a transparent process to the end user but which is able to produce a certification which has legal value, that is to say, legal proof, relative to successful interactions, between the user and the Company, by means of a platform or other type of environment set up on a WEB server.

An aim of the invention is therefore to allow the integration of a tool inside the corporate process, for example, of a Company, without introducing interruptions, which is designed to acquire legal proof with regard to an interaction which has occurred between a predetermined user and that Company.

Another aim of the invention is to provide companies with a service for the acquisition of interactions via WEB (WIAS) which makes it possible to obtain the above-mentioned certification.

Lastly, an aim of the invention to provide a tool which is able to produce a document having the value of legal proof.

These aims and others are fully achieved by the process for the legal certification of successful interaction as characterized in the appended claims.

BRIEF DESCRIPTION OF THE DRAWINGS

The features of the invention which do not emerge from the above are made clear in the following description, which should be considered with reference to the accompanying drawing, in which.

DESCRIPTION OF THE PREFERRED EMBODIMENTS

Figure 1:
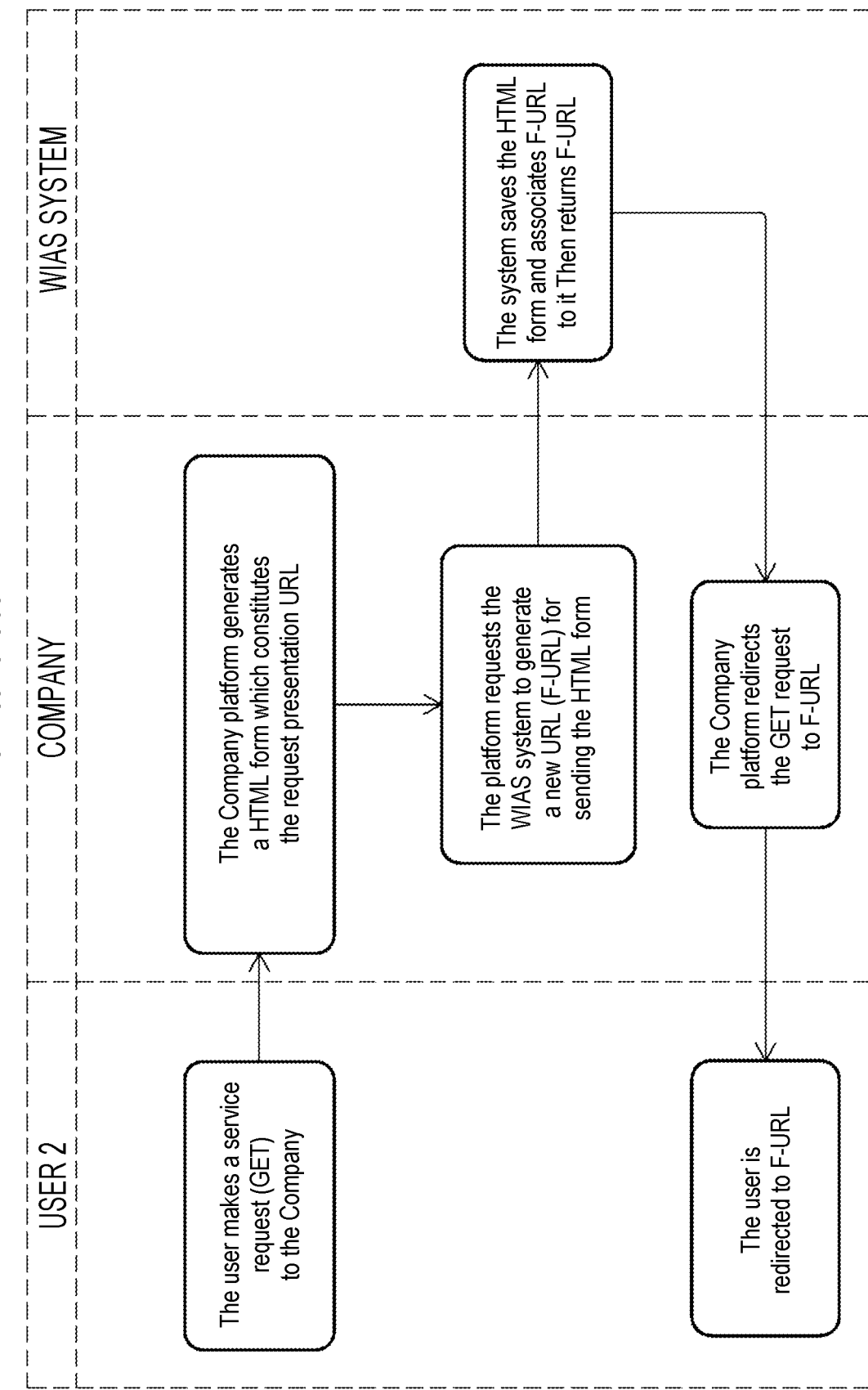
FIG. 1 illustrates a functional block diagram which summarizes in a simplified manner the operating sequence of the process according to the invention.

With reference to the above-mentioned drawings, in particular FIG. 1, the bodies involved in the implementation of the process according to this invention are substantially three, that is to say, a user 2, identified in the column to the left in FIG. 1, a Company which offers the performance of services or the supply of products, identified in the central column, and a WIAS (Web Interaction Acquisition System) identified in the column on the right.

In short, and with reference to FIG. 1, the process for the legal certification of at least one successful interaction in a data interchange system, of the type illustrated in the drawing in a simplified manner, comprises the request by the user 2 of a service (with a GET instruction, in computer language) to the Company which owns the WEB consulted each time.

Figure 2:
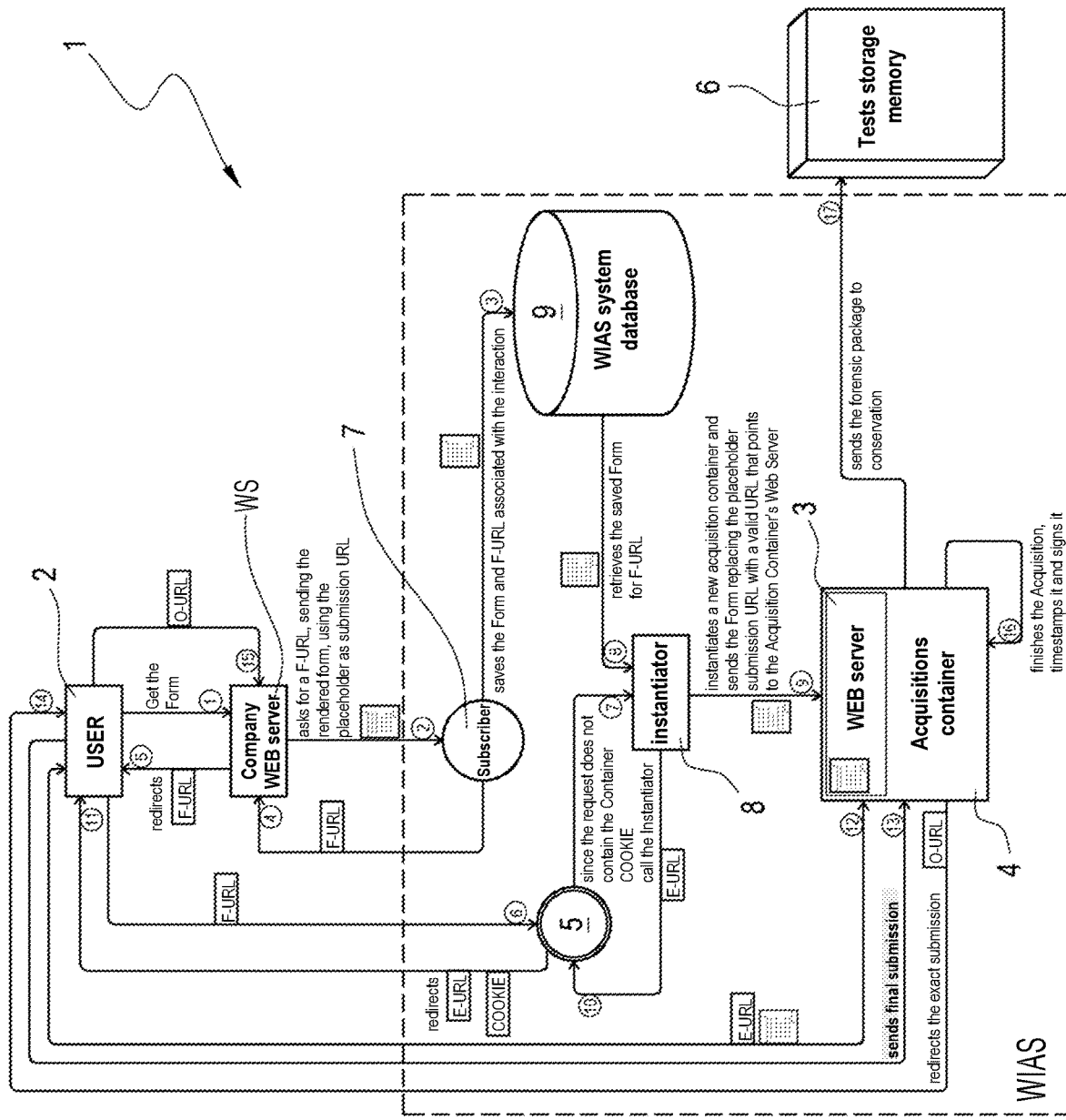
FIG. 2 illustrates a block diagram of the system provided for implementing the processes of FIG. 1.

The request is sent to an URL address (Uniform Resource Locator) by means of a Corporate telematic platform rendered operational on a Corporate WEB server WS, in use and controlled by the Company (FIG. 2). The interaction in progress may be of the "server-side rendered HTML form" type, with the creation of an HTML form on the WEB server WS, or an "interrogation to a client side served Web Application (i.e. Single Page Application)".

Again with reference to FIG. 1 (which schematically represents the "server-side rendered HTML form" case), following the request, the WEB server WS reroutes the user 2 to a page inside the WIAS.

The WEB server WS requests the acquisition system WIAS, in the column to the right in FIG. 1, to generate a new URL redirecting address, which will be referred to as F-URL, which will allow the user to access the HTML form.

The WIAS registers the HTML form on a relative database 9 (FIG. 2) then returning to the user 2, using the Corporate platform, the URL address generated for redirecting F-URL (which is associated with the HTML form which has just been registered in the database 9).

The request by the user 2 is automatically rerouted to the F-URL address which points to a gateway 5 present in the WIAS system (FIG. 2)

The request of the user 2 is sent to a gateway 5 to check in it for the presence of a TOKEN/COOKIE indicating the instantiation of a dedicated acquisition memory-storage 4 with inside a WEB server 3, which is also present in WIAS system.

If the TOKEN/COOKIE is not present, which occurs during the initial step, the first request of the user 2 to WIAS starts the instantiation of the dedicated acquisition memory-storage 4 with the dedicated WEB server 3, in this way starting the certified acquiring step.

At the same time, the TOKEN/COOKIE is created which is then transmitted to the user 2 for associating it to the subsequent requests, in order to indicate to the gateway 5 the existence of the dedicated acquisition memory-storage 4 associated with the precise interaction with the user 2.

If, on the other hand, the TOKEN/COOKIE is present, which occurs in the successive requests, the process continues with the successive steps described below.

In any case, a new endpoint is created associated with an actual URL address E-URL on the dedicated WEB server 3, on which it is also present the HTML form recovered from the database 9 of the WIAS system.

The interaction, or the interactions, of the user 2 with the generated page allocated to the actual URL address (E-URL), possibly concluded with at least one request for at least one service and acceptance of the provision of such at least one service by the Company, results in the certified acquisition of the interaction accepted, or of the interactions accepted, by the Company and the relative registration in the dedicated memory-storage 4.

The ending of the certified acquisition phase of the interaction by the acquisition system WIAS comprises the invitation to the user 2 of redirecting the request of the service accepted at the original page corresponding to the original URL address O-URL (that is, the one which would have been originally requested in the absence of integration with WIAS) of the Company in the original endpoint on the Company WEB server WS.

The redirecting to the original page corresponding to the original URL address O-URL (that is, the one which would have been originally requested in the absence of integration with WIAS) of the Company in the original endpoint on the Company WEB server WS may be, preferably, automatic.

This step, which comprises redirecting the request to the original page corresponding to the original URL address O-URL on the Company WEB server WS occurs automatically, without active intervention of the user 2.

The original page corresponding to the original URL address O-URL initially requested with regard to the implementation of the request for service then emits a response to the user 2 confirming the acceptance of the supply of the service.

After completing the final acquisition step, or, alternatively, during the final step, the acquisition system WIAS registers the interaction in the dedicated memory-storage 4 in the form of an electronic document and attaches a time stamp and an identification mark to the electronic document thus obtaining a legal proof certification.

Lastly, the marked document is sent to a legal proof certifications memory device 6.

During registration of the accepted interaction in the memory storage 4, an ID of the interaction $ID_{interaction}$ may be assigned to the interaction and the type of interaction may be defined.

To allow the acquisition system WIAS to send the HTML form with the interaction accepted, the original URL address O-URL is communicated to the WIAS and the identification of the interaction $ID_{interaction}$ is communicated to the Company.

In order to achieve an improved functionality of the process, the initial registration of the Company in the acquisition system WIAS and the assignment of a relative $ID_{Company}$ are envisaged.

This process proposed by the WIAS system represents an expansion of the normal interaction which would have taken place between the User and the Company, which would basically comprise the following steps:

a) the user opens the page from the Company;
b) the user interacts with it by a final agreement which arrives directly at the Company;
c) the user receives the adequate response.

It should be noted that these steps are provided in the process described.

It should be noted that this extension proposed by the WIAS system is transparent for the user.

This means that the user follows the same behavior which it would have with the original interaction. The only differences concern the URL will see in the browser address bar.

Moreover, thanks to the configuration of the WIAS system, its integration inside the original process of the Company will be without interruption, that is, without any significant modification of the architecture or of the code.

This means that the integration of the acquisition system WIAS in the original interactions management process by the Company takes place without introducing interruptions, that is, without changes to the hardware architecture and without substantial changes to the software code in use.

In effect, the system for implementing the process described above operates on the Internet between the device of the user 2 for access to the Internet, by which the user 2 performs the interactions, and a Company WEB server WS, connected to the Internet.

The WIAS system may be divided into two parts:
1. the actual service system;
2. the subscriber (or acceptance tool).

In effect, the subscriber represents the element which intervenes firstly in the entire process for effectively achieving something, and collaborates with the other tools of the company for obtaining the complete integration of the WIAS system in the entire process.

It defines the method which reflects the method illustrated above and described in detail below and achieves a supporting integration defining how to put into place the integration from the start, that is to say:

1. The company must initially register in the WIAS system, which assigns to it an $ID_{Company}$;
2. The company will respond positively, accepting one (or more) interactions which it wants to acquire with as legal proof. For this purpose, the interaction is registered in the WIAS system with the following data:
a. name of the interaction: that is to say, a unique identifier $ID_{interaction}$ (located, for example, in the context of the company domain).

b. the type of interaction: it may be of the "server-side rendered HTML form" type, with the creation of an HTML form on the WEB server WS, or a "demand to a client side served Web Application (i.e. Single Page Application, SPA)".

c. The original URL address (O-URL): that is to say, the URL address on the WEB server of the company at which the request for the service by the user carried out by the interaction must lastly arrive.

3. If the interaction is of the type:

i) HTML form rendered on server side:
the company must replace the original URL address for the service of the HTML form (O-URL) with the predetermined string having a place holder function.

When the company receives the GET instruction for obtaining the HTML form it will be provided as conventionally established, but instead of transmitting the HTML form with the response, it carries out, using the API (Application Programming Interface), a call to the WIAS system for its transmission, and the WIAS system responds with a new URL address (F-URL) for redirecting which is communicated by the Company to the user in response to the GET instruction.

ii) request to a Single Page Application (SPA)
in this case the Company must replace the URL address for agreement with a new address, for example https://wias.provider.com/companies/IDAzienda/interactions/IDinterazione.

The dedicated memory-storage 4 is instantiated with inside a WEB server 3, for registering the interactions of the user 2 following acceptance by a subscriber 7, using the company WEB server WS, by a instantiator 8 activated in turn by a gateway 5.

The gateway 5 carries out two functions, that is to say, providing services to the API interface of the WIAS system and controlling all the requests, deciding whether or not the memory to instantiate the dedicated memory-storage 4.

To do this, as mentioned above, the gateway 5 controls the interactions between the user 2 and the dedicated WEB server 3 and verifies the presence of the TOKEN/COOKIE indicating the existence of the dedicated memory-storage 4. It also provides the actual URL address E-URL which points to the dedicated WEB server 3.

The instantiator controls the creation of a dedicated new memory-storage 4 also replacing the agreement variable inside the HTML form. It also creates the actual URL address (E-URL) which the user uses to access the HTML form.

On the other hand, the dedicated memory-storage 4 is the body which carries out the most important work. This module provides the page with which the user 2 actually interacts (or the endpoint of the API interface, in the case of SPA).

It acquires in a forensic manner all the interactions, prepares the packet which constitutes the document having legal proof value, marks it digitally by applying a time stamp and sends it to a long-term memory device 6 (FIG. 2).

For keeping over time and then supplying the legal proof of certifications relating to the interactions performed and accepted, the acquisition system WIAS also comprises a device for storing legal proof certifications 6, connected to the memory-storage 4 intended for long-term storage of the interactions accepted, in the form of an electronic document including time stamp and identification tag $ID_{interaction}$.

Figure 3:
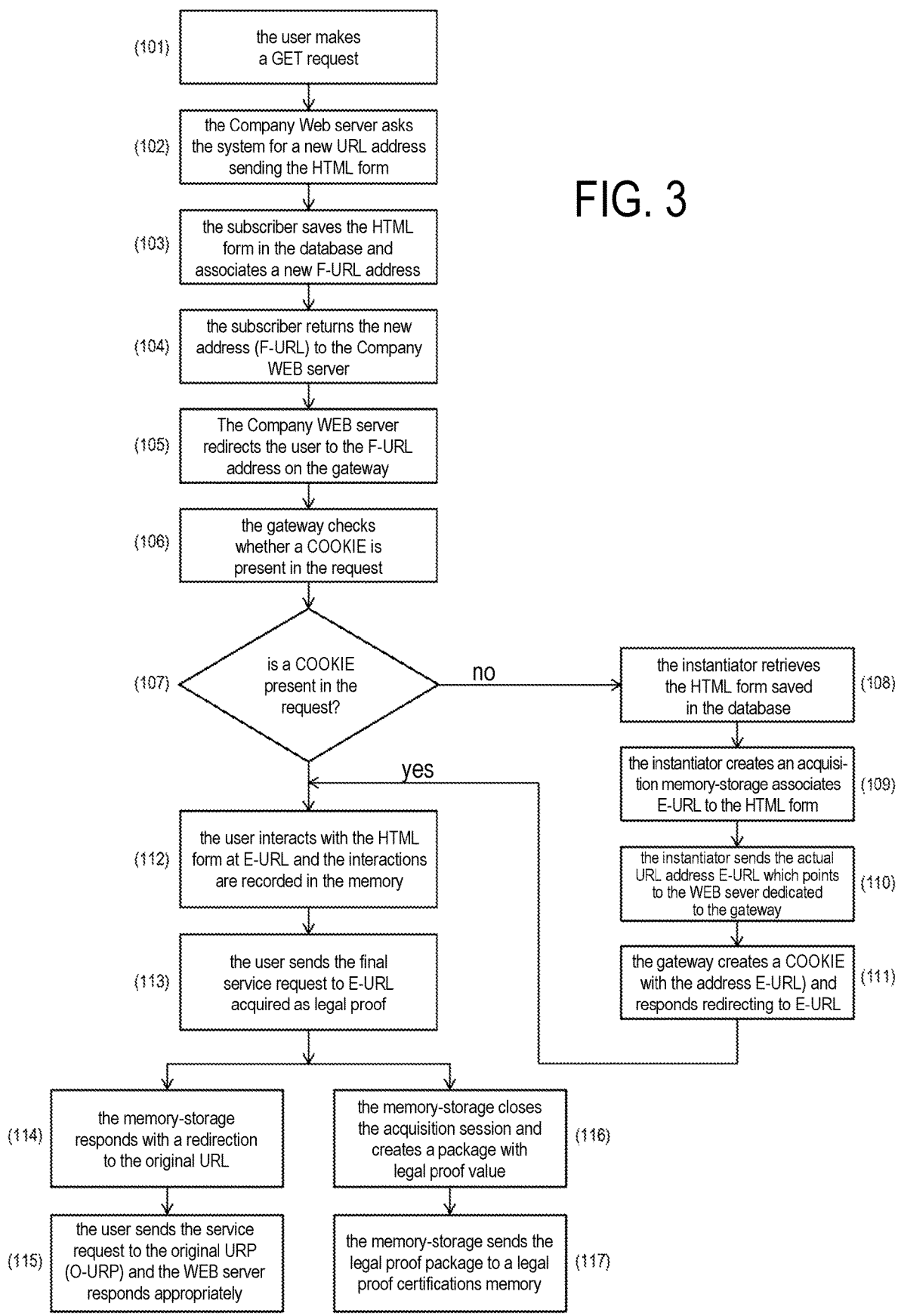
FIG. 3 illustrates a flow diagram relating to the program which implements the process according to the system described.

For the implementation of the process described made operational in the system as described above, there is a computer program which comprises the steps below described, with reference to FIG. 3.

At step 101 a user 2 makes a GET request to obtain an HTML form in order to submit a request for a service.

At step 102 a Company Web server WS asks the acquisition system WIAS for a new redirection URL address F-URL, sending the form produced with inside a predetermined string with placeholder function, which replaces the original O-URL address, as described above.

At step 103 a subscriber 7 of the acquisition system WIAS saves the HTML form in a database 9 of the acquisition system WIAS and associates a new redirection URL address F-URL to it, then at step 104 the subscriber 7 returns the new redirection URL address F-URL to the Company WEB server WS.

At step 105 the Company WEB server WS redirects the user 2 to the redirection URL address F-URL, and then the user 2 connects to the redirection URL address F-URL automatically, due to the redirection to the previous step that indicates a gateway 5, the step 106 storing the HTML form in un database 9 and checking whether there is a TOKEN/COOKIE present in the request.

The presence of a TOKEN/COOKIE in the request during the control of the gateway 5 for verifying if the TOKEN/COOKIE is present indicates that the dedicated acquisition memory-storage 4 has already been instantiated and contains the actual URL address E-URL which points to a WEB Server inside it.

Therefore, if the service request contains the TOKEN/COOKIE, the gateway 5 redirects the user 2 to the actual URL address E-URL and passes the control to the step 112, in which the user 2 interacts with the HTML form at the actual URL address E-URL.

If the TOKEN/COOKIE is, on the other hand, absent, the gateway 5 at step 107 makes operational an instantiator in order to proceed with the creation of an acquisition memory-storage 4 with an associated dedicated WEB server 3, thus starting a legal proof acquiring session, and at step 108 the instantiator recovers the HTML form stored in the database 9.

At the step 109 the instantiator creates the dedicated acquisition memory-storage 4 and modifies the HTML form by associating an effective URL address E-URL thereto, which is communicated to the dedicated Web server 3 associated with the dedicated acquisition memory-storage 4 to submit this modified HTML form to the user 2.

At step 110 the instantiator sends actual URL E-URL, which points to the dedicated Web server 3 associated with the dedicated acquisition memory-storage 4, again to gateway 5 which, to at step 111, creates a TOKEN/COOKIE containing the actual URL address E-URL encrypted and replies to the request of the user 2 with a redirection to the actual URL E-URL with the TOKEN/COOKIE.

At step 112 the user 2 interacts with the HTML form at the actual URL address E-URL and the interactions are registered in the forensic dedicated acquisition memory-storage 4.

At step 113 the user 2 sends the final service request by means of the actual URL address E-URL and this interaction is acquired as legal proof, and then, at step 114, the acquisition memory-storage 4 replies with a redirection of the request to original URL address O-URL.

At step 115 the user 2 automatically sends the service request to the original URL address O-URL located within the Company WEB server WS, which replies appropriately.

At step 116 the dedicated acquisition memory-storage 4 closes the legal proof acquisition step, applies a time mark and an identification mark to the HTML form, thus creating a legal proof package.

At step 117 the acquisition memory-storage 4 sends the legal proof package to a legal proof certifications memory 6.

The advantages of the invention are evident.

On the basis of the ISO standard (ISO 27037: 2012), for the acquisition with legal value and the conservation of digital proof, WIAS will create a document having legal proof value, but with solid proof, such that it can be used in a court of law, preventing the counterpart from making any attempt to dispute the interaction with the request of a service, such as the signing of an agreement.

As may be seen from the name, the WIAS system is a WEB service which publishes an API (Application Programming Interface) which is used by the company to create the document having solid legal proof value regarding the interaction with the user.

In order to better clarify the concept on which the process is based, the meaning of the term "solid" is specified below.

The aim is to guarantee that a certain interaction has occurred in a definitive fashion between the user and a Company, more specifically to demonstrate that if the company declares that a certain interaction has occurred with the company then this has occurred in an irrefutable manner.

Therefore, if the demonstration which is being provided satisfies the above-mentioned criteria, it can be stated that the proof is solid.

The definition may be broken down into two parts, dividing the condition which it establishes.

The Company declares that a certain interaction by a user, in a context in which only those cases in which the Company declares that the user has performed the interaction are of interest.

If the Company has used the WIAS system to acquire this interaction, then a document exists having value of proof provided by the WIAS system, which declares that the User has interacted with the Company.

In order to have certainty that the existence of the document having value of proof irrefutably implies that the interaction has occurred, the two cases are analyzed in which, on the other hand, the document does not imply the successful interaction.

1. Someone or something simulates the interaction as if it were the user
2. Someone or something intercepts the communication and changes the packages before they reach the acquisition storage
3. There are parts missing in the document having legal value, such as the page which the user is displaying or the data which the user is sending.
4. The time mark is missing or does not correspond to that with respect to which the Company claims the interaction.

It may easily assumed that if none of the previous conditions is true, then the premise is certainly true, hence the proof is solid.

With regard to point 1, when the acquisition memory-storage 4 starts the certified acquisition session, all the possible traffic is prohibited except for the planned https request, which can arrive from the user by means of the actual URL address E-URL.

The actual URL address E-URL is a unique address created temporarily and after the session has started.

It is strictly linked to a private key/token which lies inside the acquisition memory-storage 4 and is supplied in a secure manner to the user (being stored in a secure manner in a secure TOKEN/COOKIE).

Therefore, even if someone tried to access the dedicated acquisition memory-storage 4, the access would be automatically blocked due to a failed link with the private key/token.

The document having legal proof value contains the IP address of the user who performed the interaction.

Point 2 is guaranteed by using a secure HTTP connection during the communication with the dedicated acquisition memory-storage 4.

On the other hand, with regard to point 3, a tool operates inside the dedicated acquisition memory-storage 4 which analyses all the pertinent Internet packets which pass through the memory-storage 4 and generates a dumping of this traffic, therefore also showing the IP address of the specific user which interacted with the page.

In the case of SSL/TLS traffic, the session keys will be supplied together with the dump. It is possible, optionally, to add further traffic in order to provide further guarantees on the correctness of the names and/or the routing.

The content which the user sees in the relative browser must be contained in the document having legal proof value, and this occurs because it is registered by the Web server inside the forensic acquisition memory-storage.

The final sending must also be registered inside the document having legal proof value, providing the HTML form replacing a predetermined string having a place holder function with an internal URL address which guarantees that the sending traffic passes directly inside the dedicated acquisition memory-storage 4.

Moreover, each single acquisition memory-storage 4 refers to a single user 2, in such a way that in each individual dump file there is only the traffic generated by that specific user 2.

Lastly, with respect to point 4, at the end of the process, the dump file and other significant files are grouped together in a single acquisition packet, with date and time and with digital signature.

These actions together check that the interaction of the user is performed in a specific time interval and that the interaction of the user originated from that specific IP address.

It can therefore be stated that points 1, 2, 3 and 4 do not occur in any case if the architecture of the WIAS system is followed.

It is therefore correct to state that in the context of the WIAS system the test produced, that is to say, the document having legal proof value, must be considered solid.

What is claimed is:

1. A system for implementation of a process for legal certification of at least one successful interaction in a data interchange system between a Company or Organization and a user through a Company WEB server, the process comprising:

a request to open a WEB page made by the user through a telematic connection to an endpoint at the Company WEB server;

the Company WEB server generating the requested WEB page and sending the generated WEB page via the WEB to an interaction acquisition system;

starting a certified acquisition step by the interaction acquisition system and creating a new endpoint on a WEB server, by which the generated WEB page is subsequently managed;

the endpoint replying to the user request on the Company WEB server by sending the user an actual URL address relative to the WEB page on the dedicated WEB server;

displaying the generated WEB page allocated to the actual URL address to the user;

user interaction with the generated WEB page allocated to the actual URL address;

certified acquiring of the at least one successful interaction accepted by the Company or Organization and registration of the at least one successful interaction in a dedicated memory-storage associated with the WEB server;

ending the certified acquiring of the at least one successful interaction by the interaction acquisition system and transmission of a request for redirection to the user, aimed at redirecting the request of at least one service to the original WEB page corresponding to an original URL address, corresponding to an original endpoint on the Company WEB server, which would have been originally requested by the user in an absence of integration with the interaction acquisition system;

issuing a reply to the user by the original WEB page corresponding to the original URL address regarding implementation of at least one request for at least one service;

sending every electronic document including a time stamp and an identification tag to a memory device configured for storing legal proof certifications;

the system operating on an Internet network between a user device for accessing the internet network, through which the user interacts on the internet network, and the Company WEB server, connected to the internet network, configured to generate the WEB page with corresponding original URL address following a request of the user, in order to provide services and collect requests for performance of the services by at least one chosen from giving and denying acceptance of the requests;

the system comprising:

a subscriber interfaced with the Company WEB server and configured to generate a new redirect address associated with the WEB page generated by the Company WEB server and to communicate the new redirect address to the Company WEB server, as well as to receive the interactions accepted by the Company WEB server; and a dedicated memory-storage instantiated and associated with the WEB server for registration of the interactions of the user following acceptance by a subscriber through the Company WEB server.

2. The system according to claim 1, wherein the certified acquiring step by the acquisition system provides for registration of the at least one successful interaction in a form of an electronic document in the dedicated memory-storage, attaching a time stamp and an identification mark to the electronic document thus obtaining a legal proof certification.

3. The system according to claim 2, wherein registration of the accepted interaction in said dedicated memory-storage includes assigning an interaction ID to the interaction, defining the type of interaction, communicating the original URL address to which the interaction is to be sent to the acquisition system, and communicating the interaction identifier to the Company.

4. The system according to claim 3, wherein the interaction is configured as a "server-side rendered HTML form" or "client side served Web Application request".

5. The system according to claim 1, wherein an intermediate phase is provided to start said registration step, which includes sending a redirecting URL address that points to a gateway for verification of the presence of a TOKEN/COOKIE in the request, the TOKEN/COOKIE being indicative of the existence of the dedicated acquisition memory-storage associated with the WEB server, and for instantiation of the dedicated acquisition memory-storage associated with the WEB server in the event that the TOKEN/COOKIE is missing, thereby initiating the certified acquiring step, and creation of the TOKEN/COOKIE and transmission of the TOKEN/COOKIE to the user, in order to associate the TOKEN/COOKIE to subsequent requests, together with the actual URL.

6. The system according to claim 1, wherein the step of redirecting the at least one request for at least one service to the original page corresponding to the original URL address, which would have been originally requested by the user as destination in the absence of integration with WIAS, is performed automatically.

7. The system according to claim 6, wherein generating the original page includes preparation of a corresponding HTML form by said WEB server, the form being used in the exchange of interactions with the user.

8. The system according to claim 1, wherein initial registration of the Company in the acquisition system and assignment of a relative ID to the Company are performed.

9. The system according to claim 1, wherein sending the generated page to the WEB interactions acquisition system, starting a certified acquisition step by the acquisition system, creating a new endpoint by which the generated page is subsequently managed, assigning an actual URL address corresponding to the page on said WEB server, and closing the acquiring step are transparent to the user, with only the redirection URL, firstly, and the actual URL corresponding to the new endpoint afterword, being visible to the user.

10. The system according to claim 1, wherein integration of the acquisition system in the original interactions management process by the Company takes place without introducing interruptions, without changes to the hardware architecture and without changes to the software code in use.

11. The system according to claim 1, also comprising:

a gateway, configured to check the interactions between the user and the WEB server and to verify a presence of a TOKEN/COOKIE in the interactions, which is indicative of an existence of the dedicated memory-storage and to supply the actual URL address; an instantiator, configured to instantiate the dedicated memory-storage on the WEB server, upon instruction of the gateway following verified missing of the TOKEN/COOKIE.

12. The system according to claim 1, further including a memory device for storing legal proof certifications, connected to the dedicated memory-storage and configured for long-term storing of the interactions of the user accepted by the Company or Organization, the legal proof certifications stored respectively as electronic documents, each including a time stamp and an identification tag attached by the dedicated WEB server during registration.

13. A computer program for implementation of a process for legal certification of at least one successful interaction in a data interchange system between a Company or Organization and a user through a Company WEB server, the process comprising:

a user request to open a WEB page made by the user through a telematic connection to an endpoint at the Company WEB server;

the Company WEB server generating the requested WEB page and sending the generated WEB page via the WEB to an interaction acquisition system;

starting a certified acquisition step by the interaction acquisition system and creating a new endpoint on a WEB server, by which the generated WEB page is subsequently managed;

the endpoint replying to the user request on the Company WEB server by sending the user an actual URL address relative to the WEB page on the dedicated WEB server;

displaying the generated WEB page allocated to the actual URL address to the user;

user interaction with the generated WEB page allocated to the actual URL address;

certified acquiring of the at least one successful interaction accepted by the Company or Organization and registration of the at least one successful interaction in a dedicated memory-storage associated with the WEB server;

ending the certified acquiring of the at least one successful interaction by the interaction acquisition system and transmission of a request for redirection to the user, aimed at redirecting at least one request for at least one service to the original WEB page corresponding to an original URL address, corresponding to an original endpoint on the Company WEB server, which would have been originally requested by the user in an absence of integration with the interaction acquisition system;

issuing a reply to the user by the original WEB page corresponding to the original URL address regarding implementation of the at least one request for the at least one service;

sending every electronic document including a time stamp and an identification tag to a memory device configured for storing legal proof certifications;

the computer program configured to comprise the following steps:

(101) the user makes a GET request to obtain an HTML form in order to submit the at least one request for the at least one service;

(102) the Company WEB server asks the interaction acquisition system for a new redirection URL address and sends an HTML form produced with the original URL address replaced by a predetermined string with placeholder function;

(103) a subscriber of the interaction acquisition system saves the HTML form in a database of the interaction acquisition system and associates a new redirection URL address to the HTML form;

(104) the subscriber returns the new redirection URL address to the Company WEB server;

(105) the Company WEB server redirects the user to the redirection URL address, and then the user connects to the redirection URL address automatically, due to redirection to the previous step that indicates a gateway;

(106) the gateway saves the HTML form in a database and checks for a presence or absence of a TOKEN/COOKIE in the user request;

(107a) upon determining that the TOKEN/COOKIE is present in the user request, skipping steps (107b) through (111);

(107b) upon determining that the TOKEN/COOKIE is absent, then causing the gateway to activate an instantiator in order to proceed with creation of a dedicated acquisition memory-storage, thus initiating a legal proof acquiring step;

(108) the instantiator retrieves the HTML form saved in the database;

(109) the instantiator creates a dedicated acquisition memory storage, and modifies the HTML form by associating an effective URL address thereto, and communicates to the Web server associated with the dedicated acquisition memory-storage to submit this modified HTML form to the user;

(110) the instantiator sends the actual URL address, that points to the dedicated Web server associated with the acquisition memory-storage, back to the gateway;

(111) the gateway creates a TOKEN/COOKIE containing the actual URL address (encrypted) and replies to the user request with a redirection to the actual URL address with the TOKEN/COOKIE;

(112) the user interacts with the HTML form at the actual URL address and the interactions are recorded in the dedicated acquisition memory-storage;

(113) the user sends a final service request via the actual URL address and this interaction is acquired as legal proof;

(114) the dedicated acquisition memory-storage replies by redirecting the final service request to the original URL address;

(115) the user automatically sends the final service request to the original URL address located within the Company WEB server, which replies;

(116) the dedicated acquisition memory-storage closes the legal proof acquisition step, applies a time mark and an identification mark to the HTML form, thus creating a legal proof package;

(117) the dedicated acquisition memory-storage sends the legal proof package to a legal proof certifications memory.

14. The computer program according to claim 13, in which the presence of a TOKEN/COOKIE in the HTML form, indicates that the acquisition memory-storage has already been instantiated and contains the actual URL address.

15. The computer program according to claim 14, and further comprising, upon determining that the HTML form related to the service request contains the TOKEN/COOKIE, the gateway redirects the user to the actual URL address and passes control to the step (112) in which the user interacts with the HTML form at the actual URL address.

16. The computer program according to claim 13, in which the steps (114) in which the dedicated acquisition memory-storage replies by redirecting the request to the original URL address and (115) in which the user sends the service request to the original URL address are carried out simultaneously in parallel with the steps (116) in which the dedicated acquisition memory-storage closes the acquiring step applying a time and identification mark to the HTML form and (117) in which the same acquisition memory-storage sends the legal proof package to the legal proof certifications memory.

17. The computer program according to claim 13, wherein the certified acquiring step by the acquisition system provides for registration of the interaction in the form of an electronic document in the dedicated memory-storage, attaching a time stamp and an identification mark to the electronic document thus obtaining a legal proof certification.

18. The computer program according to claim 17, wherein registration of the accepted interaction in said dedicated memory-storage includes assigning an interaction ID to the interaction, defining the type of interaction, communicating the original URL address to which the interaction is to be sent to the acquisition system, and communicating the interaction identifier to the Company or Organization.

19. The computer program according to claim 18, wherein the interaction is configured as a "server-side rendered HTML form" or "client side served Web Application request".

20. The computer program according to claim 13, wherein an intermediate phase is provided to start said registration step, which includes sending a redirecting URL address that points to a gateway for verification of the presence of a TOKEN/COOKIE in the request, the TOKEN/COOKIE being indicative of the existence of the dedicated acquisition memory-storage associated with the WEB server, and for instantiation of the dedicated acquisition memory-storage associated with the WEB server in the event that the TOKEN/COOKIE is missing, thereby initiating the certified acquiring step, and creation of the TOKEN/COOKIE and transmission of the TOKEN/COOKIE to the user, in order to associate the TOKEN/COOKIE to subsequent requests, together with the actual URL.

\* \* \* \* \*